(12) United States Patent
Song et al.

(10) Patent No.: US 9,076,055 B2
(45) Date of Patent: Jul. 7, 2015

(54) DETECTION SYSTEM AND METHOD SUITABLY USED ON PRODUCTION LINE

(71) Applicants: INVENTEC (PUDONG) TECHNOLOGY CORPORATION, Shanghai (CN); INVENTEC CORPORATION, Taipei (TW)

(72) Inventors: Jian-Fu Song, Taipei (TW); Po-Jui Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/228,793

(22) Filed: Mar. 28, 2014

(65) Prior Publication Data

US 2015/0144690 A1   May 28, 2015

(30) Foreign Application Priority Data

Nov. 27, 2013   (CN) .......................... 2013 1 0616605

(51) Int. Cl.
G06K 7/10   (2006.01)
(52) U.S. Cl.
CPC .................. G06K 7/10871 (2013.01)
(58) Field of Classification Search
CPC ................................................. G06K 7/10871

USPC ................. 235/375, 462.08, 462.09
See application file for complete search history.

(56) References Cited

U.S. PATENT DOCUMENTS

| 2004/0223663 A1* | 11/2004 | Cato ........................... 382/318 |
| 2011/0164163 A1* | 7/2011 | Bilbrey et al. ............ 348/333.01 |
| 2013/0223673 A1* | 8/2013 | Davis et al. .................... 382/100 |

* cited by examiner

Primary Examiner — Thien M Le
Assistant Examiner — Toan Ly
(74) Attorney, Agent, or Firm — Bacon & Thomas, PLLC

(57) ABSTRACT

A detecting system and method suitably used on a production line are disclosed, where a sensing device is arranged on a fixed position of a conveying belt, an image acquiring device and a bar code reading device are vertically arranged above the conveying belt, respectively, a computing device calculates a picture acquiring time of the acquired picture comprising a detection printed circuit board (PCB) acquired by the image acquiring device, and the computing device calculates a position to be moved by the bar code reading device to control the bar code reading device to move and read the production serial number of the detection PCB, whereby a corresponding detection drafting is queried according to a production serial number and optically detecting the detection PCB according to the detection drafting. By means of the above technical means, the detection PCB may be detected on the production line, and thus promoting the production efficiency and detection efficiency of the detection PCB.

10 Claims, 7 Drawing Sheets

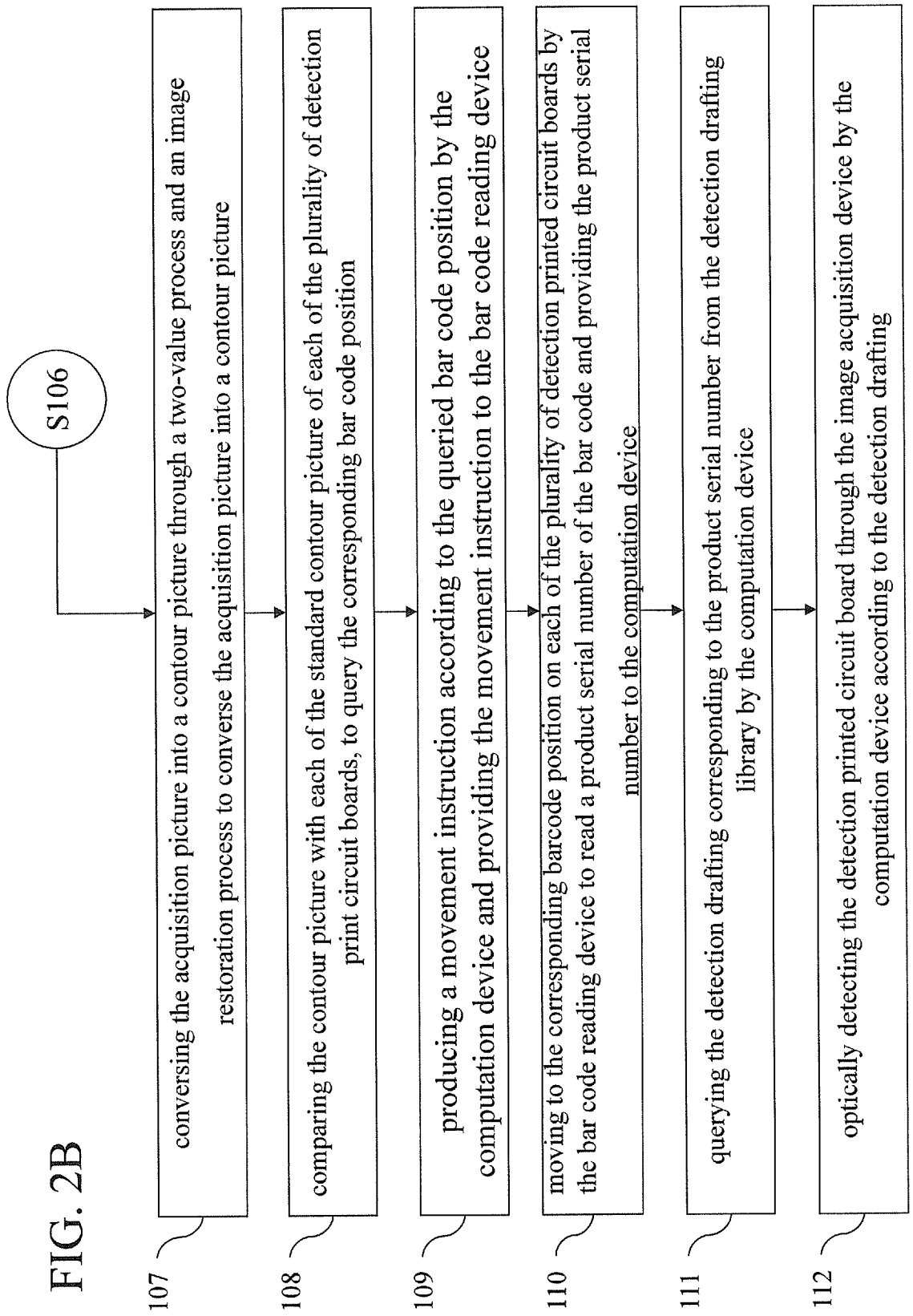

DETECTION SYSTEM AND METHOD SUITABLY USED ON PRODUCTION LINE

BACKGROUND OF THE RELATED ART

1. Technical Field

The present invention pertains to a detecting system and method, and particularly to a detecting system and method suitably used on a production line.

2. Related Art

On a detection printed circuit board (PCB), there is a bar code bonded, in which a production serial number is stored. Through the bar code, the detection PCB may be identified.

When the detection PCB is to be detected, the production serial number in the bar code on the detection PCB is read. Further, a detection drafting is queried according to the production serial number, the detection PCB is detected according to the detection drafting then.

For the production line, it is typically required to first take down the detection PCB therefrom and then the detection PCB may be read for its bar code. As such, the detection drafting is queried according to the production serial number and the detection PCB is detected according to the queried detection drafting.

The currently available technology for testing the detection PCB is additionally applied onto the detection PCB, i.e. the detection PCB may not be detected directly on the production line, which reduces a production efficiency and a detection efficiency. Therefore, there is quite a need to improve such situation to avoid an undesired production efficiency and poor detection efficiency.

In view of the above, there is a need to improve the long such situation encountered in the prior art, where the detection PCB on the production line is required to be detected additionally thus causing the undesired production efficiency and detection efficiency.

SUMMARY

In view of the issue encountered in the prior art, where the detection PCB on the production line is required to be detected additionally thus causing the undesired production efficiency and detection efficiency, the present invention discloses a test system and method suitably used on a production line.

According to the present invention, the detecting system used on a production line comprises a plurality of detection printed circuit boards, each having a bar code; a conveying belt, conveying each of a plurality of detection boards laying on the belt; a sensing device, arranged on a fixed position, and triggering a computation instruction when sensing the detection printed circuit board; an image acquiring device, vertically arranged on the belt, and acquiring an acquisition picture comprising the detection printed circuit board according to an acquisition instruction; a bar code reading device, vertically arranged on the belt, and reading a production serial number according to a movement instruction corresponding to bar code according to a movement instruction; and a computing device, comprising a contour library, storing a standard contour picture and a corresponding bar code position of each of the plurality of printed circuit boards; a detection drafting library, storing the production serial number and a detection drafting; a receiving module, receiving the computation instruction from the sensing device, and acquiring the acquisition picture and receiving the production serial number from the bar code; a computation module, computing an image acquisition time according to a fixed movement speed of the belt, a fixed distance between the sensing device and the image acquisition device and the a half of a maximum length of each of the detection printed circuit boards; an image processing module, conversing the acquisition picture into a contour picture through a two-value process and an image restoration process to converse the acquisition picture into a contour picture; a contour querying module, comparing the contour picture with each of the standard contour picture of each of the plurality of detection print circuit boards, to query the corresponding bar code position; a producing module, producing the acquisition instruction according to the image acquisition time, and producing the movement instruction according to the queried bar code; a transmission module, transmitting the acquisition instruction to the image acquisition device, and transmitting the movement instruction to the bar code; a query module, optically detecting the detection printed circuit board through the detection drafting according to the detection drafting through the image acquisition device; and a detection module, optically detecting the detection printed circuit board through the image acquisition device according to the detection drafting.

According to the present invention, the detecting method used on a production line comprises steps of providing a plurality of detection printed circuit boards each having a bar code, and being moved by a conveying belt; providing a sensing device arranged on a fixed position, a belt vertically arranged on the belt, and an image acquiring device vertically arranged above the belt; providing a computing device, comprising a contour library storing a standard contour picture and a corresponding bar code position of each of the plurality of printed circuit boards, and a detection drafting library storing the production serial number and a detection drafting; triggering a computation instruction to the computing device when the detecting device detects the detection print circuit board; computing an image acquisition time according to a fixed movement speed of the belt, a fixed distance between the sensing device and the image acquisition device and a half of a maximum length of the detection printed circuit board, when the computation receives the computation instruction; conversing the acquisition picture into a contour picture through a two-value process and an image restoration process to converse the acquisition picture into a contour picture; comparing the contour picture with each of the standard contour picture of each of the plurality of detection print circuit boards, to query the corresponding bar code position; producing an acquisition instruction according to the image acquisition time and providing the image acquisition time to the image acquisition device by the computing device, acquiring an acquisition picture comprising the detection printed circuit according to the acquisition instruction and providing the acquisition picture to the computing device; conversing the acquisition picture into a contour picture through a two-value process and an image restoration process by the computing device; comparing the contour picture with a standard contour picture of each of the detection printed circuit boards to query the corresponding bar code position by the computing device; moving to the corresponding barcode position on each of the plurality of detection printed circuit boards by the bar code reading device to read a product serial number of the bar code and providing the product serial number to the computing device; querying the detection drafting corresponding to the product serial number from the detection drafting library by the computing device; and optically detecting the detection printed circuit board through the image acquisition device by the computing device according to the detection drafting.

As compared to the prior art, the system and method has the difference that the sensing device is arranged on a fixed position of the conveying belt, the image acquiring device and the bar code reading device are vertically arranged above the conveying belt, respectively, the computing device calculates the picture acquiring time of the acquired picture comprising the detection PCB acquired by the image acquiring device, and the computing device calculates the position to be moved by the bar code reading device to control the bar code reading device to move and read the production serial number of the detection PCB, whereby the corresponding detection drafting is queried according to the production serial number and optically detecting the detection PCB according to the detection drafting.

By means of the above technical means, the detection PCB may be detected on the production line, and thus promoting the production efficiency and detection efficiency.

BRIEF DESCRIPTION OF THE DRAWINGS

The invention will become more fully understood from the detailed description given herein below illustration only, and thus is not limitative of the present invention, and wherein:

FIGS. 2A and 2B are a flowchart of a detecting method suitably used on the production line according to the present invention;

DETAILED DESCRIPTION

The present invention will be apparent from the following detailed description, which proceeds with reference to the accompanying drawings, wherein the same references relate to the same elements.

In the following, the context is contributed to describe the present invention in details in connection with the annex drawings and the embodiments with respect to the features and implementations thereof, which is sufficient to enable those who skilled in the art readily to realize the technical mechanism intent to solve the technical problems and implement the same, so as to achieve in the efficacy exclaimed in the present invention.

Figure 1A:
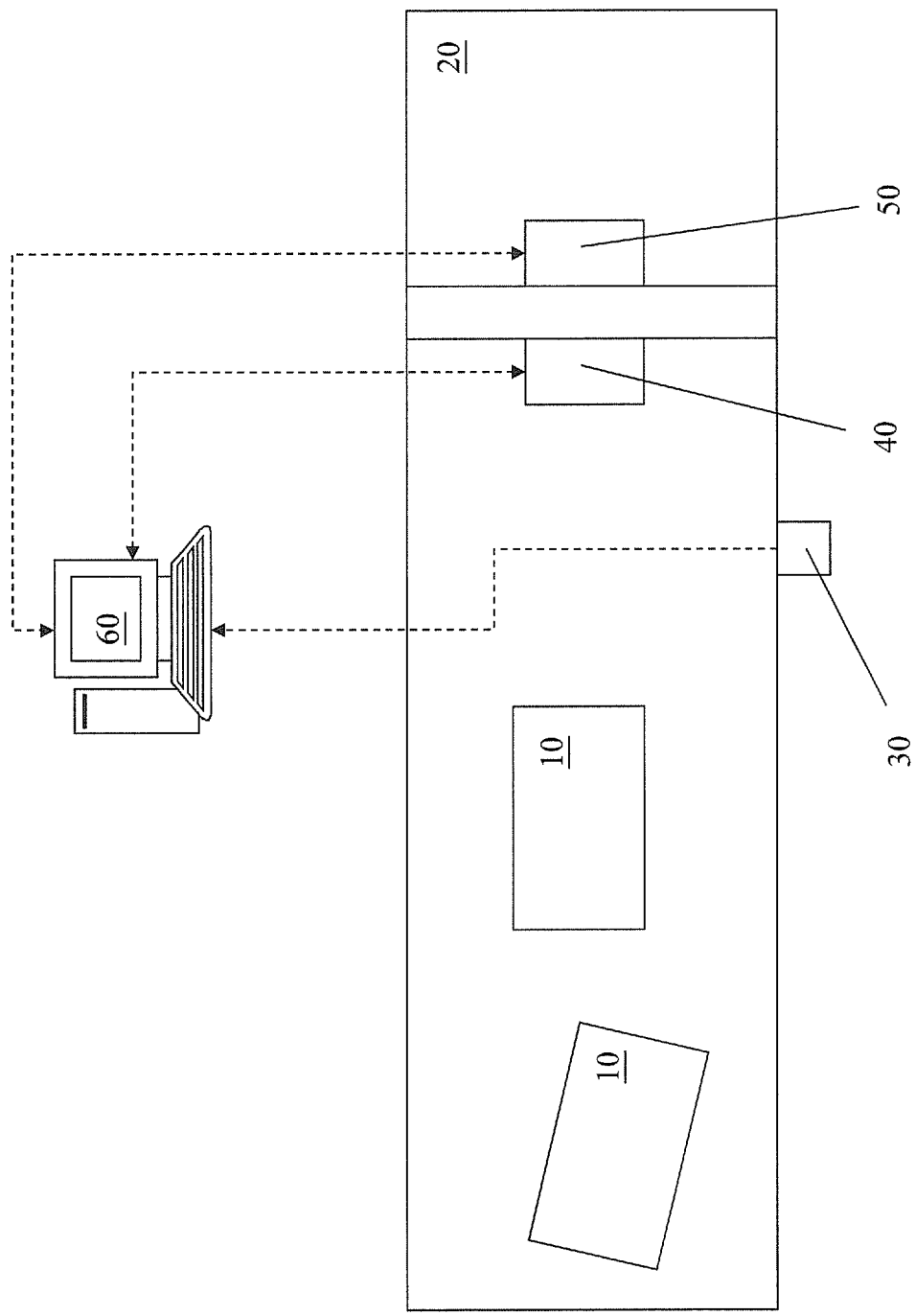
FIG. 1A is a first viewing angle architecture diagram of a detecting system suitably used on a production line according to the present invention.
Figure 1B:
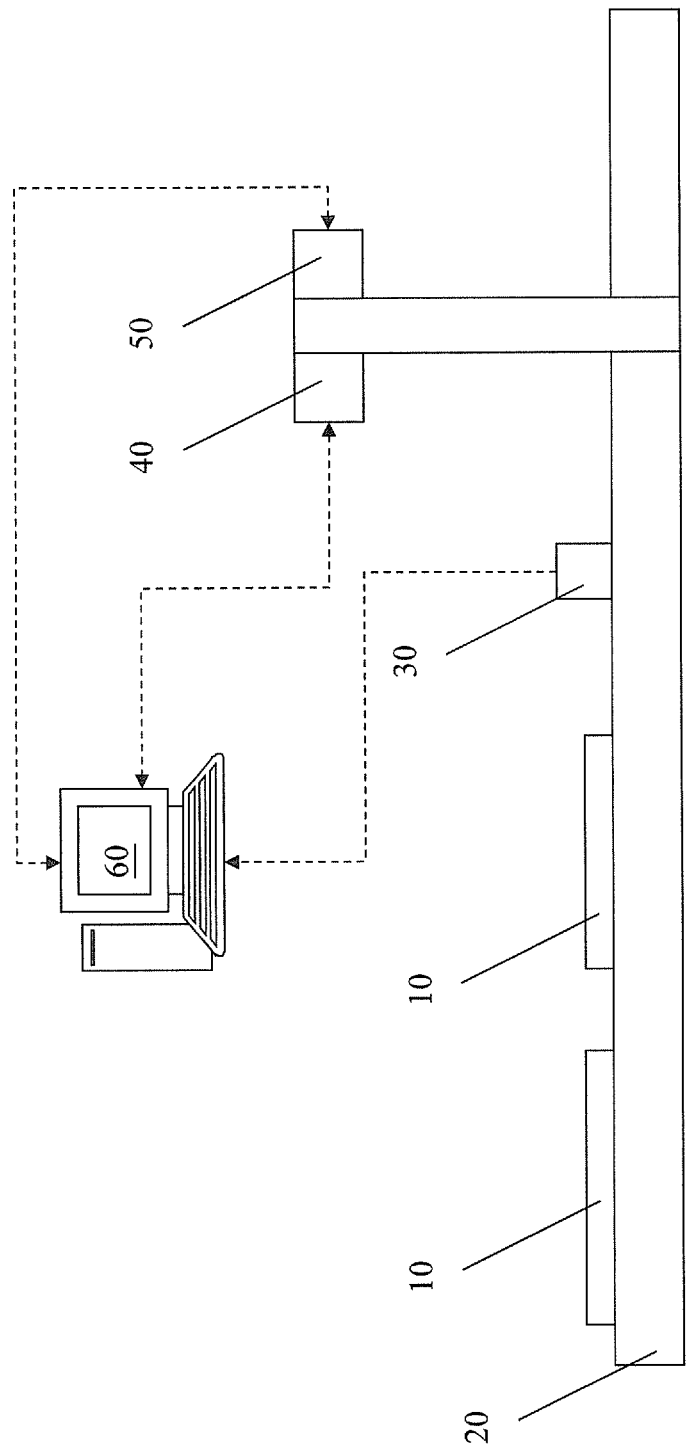
FIG. 1B is a second viewing angle architecture diagram of the detecting system suitably used on the production line according to the present invention.
Figure 1C:
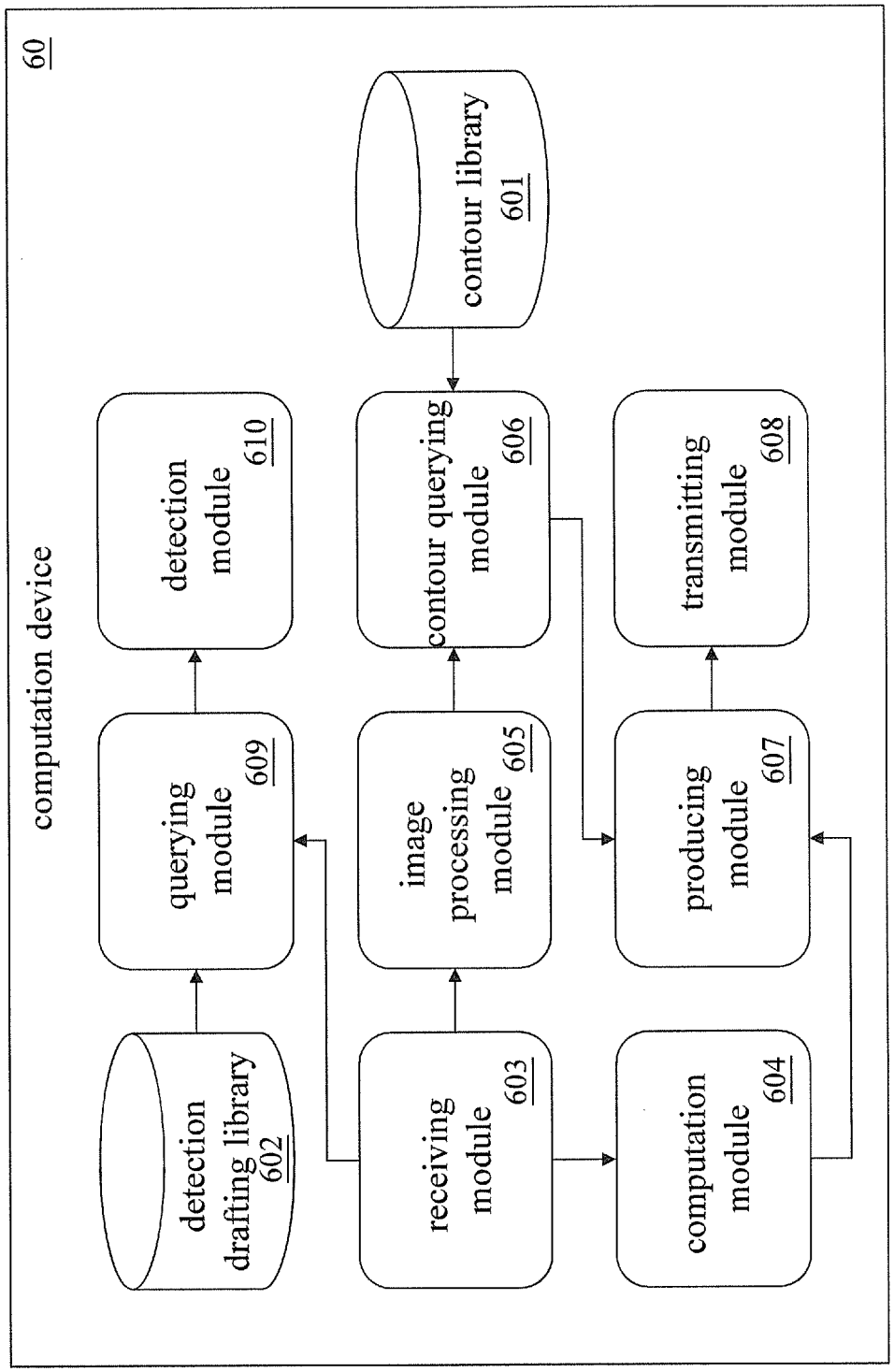
FIG. 1C is a third viewing angle architecture diagram of the detecting system suitably used on the production line according to the present invention.

In the following, the description is first dedicated to a detecting system suitably used on a production line, with reference to FIG. 1A through FIG. 1C, in which FIG. 1A is a first viewing angle architecture diagram of a detecting system suitably used on a production line according to the present invention, FIG. 1B is a second viewing angle architecture diagram of the detecting system suitably used on the production line according to the present invention, and FIG. 1C is a system block diagram of the detecting system suitably used on the production line according to the present invention.

The detecting system according to the present invention comprises a plurality of detection printed circuit board (PCB) 10, a conveying belt 20, an image acquiring device 40, a bar code reading device 50 and a computing device 60. The computing device 60 further comprises a contour library 601, a detection drafting library 602, a receiving module 603, a computation module 604, an image processing module 605, a contour querying module 606, a producing module 607, a transmitting module 608, a querying module 609, and a detecting module 610.

The plurality of detection PCBs 10 are placed on the conveying belt 20, and are moved by a movement of the conveying belt 20. On each of the detection PCBs, a bar code is provided, which includes a single dimensional bar code and a two dimensional bar code, each has a production serial number stored therein. And the detection PCB 10 may be the same kind of detection PCB or different detection PCBs. Namely, the detection PCBs 10 on the conveying belt 20 may totally the same kind, or totally different kinds. Alternatively, on the conveying belt 20 may be some identical and the other different detection PCBS 10. The above is merely examples, without limiting the present invention.

The sensing device 30 may detect the detection PCB 10 on the conveying belt 20 by means of infrared (merely an example, without limiting the present invention), and may trigger a calculating instruction and provide the calculating instruction to the computing device 60 when detecting the detection PCB 10.

The computing device 60 may be a desktop computer and a notebook computer, etc, which are merely examples, without limiting the present invention. The computing device 60 may connect to the sensing device 30 through a cable connection or a wireless transmission manner, and receives from the sensing device 30 by the receiving module 603 thereof.

When the receiving module 603 of the computing device 60 receives the calculating instruction, the computation module 604 of the computing device 60 may calculate an image acquiring time according to a fixed moving speed of the conveying belt 10 and a fixed distance between the sensing device 30 and the image acquiring device 40.

For example, assume the conveying belt 10 has a fixed speed of "5 cm/s", a fixed distance between the sensing device 30 and the image acquiring device 40 is "50 cm", and the detection PCB 10 has a half of its maximum length of "50 cm". The sum of the fixed distance between the sensing device 30 and the image acquiring device 40 and the half length of the detection PCB 10 is obtained and the sum is divided by the fixed movement speed of the conveying belt 10 as "5 cm/s". And the calculated image acquiring time is "20 s".

After the computation module 604 of the computing device 60 calculates the image acquiring time, the producing module 607 of the computing device 60 produces an acquiring instruction according to the image acquiring time, and the transmitting module 608 of the computing device 60 transmits the produced acquiring instruction by the producing module 60 of the computing device 60 to the image acquiring device 40, which is vertically disposed above conveying belt 10.

After the image acquiring device 40 obtains the acquiring instruction from the computing device 60, it may acquire the acquisition picture comprising the detection PCB and provide the acquisition picture to the computing device 60. Namely, the image acquiring device 40 provides the acquisition image after the image acquiring device 40 computes the image acquiring time to the computing device 60. It is to be noted that the image acquiring device 40 is vertically disposed above the conveying belt 20 and may be referred in FIG. 1B for its arrangement.

The computing device 60 may connect to the image acquiring device 40 through a cable transmission or a wireless transmission, and receive the acquisition picture from the image acquiring device 40 at its receiving module 603.

When the receiving module 603 of the computing device 60 receives the acquisition picture, the image processing module 605 of the computing device 60 converting the acquisition picture into a contour picture by using a two-value process and an image restoring process. The image processing module 605 of the computing device 60 acquires a contour of the detection PCB 10 in the acquisition picture by using the two-value process. Then, the image restoring process is further used to convert the contour of the detection PCB after subjecting to the two-value process into a contour picture by using an image conversion matrix which applies a rotation conversion and a shift conversion. For the mentioned two-value process and the image restoring process, refer to their current technology directly, and omitted herein for clarity.

In the computing device 60, a contour library 601 is pre-established, in which a standard contour picture and a bar code position of each of the detection PCBs 10 is stored. After the image processing module 605 of the computing device 60 converts the acquisition image into the contour picture, the contour querying module 606 of the computing device 60 compares the contour picture with each of the detection PCB 10 in the contour library 601. When the contour querying module 606 of the computing device 60 finds a standard contour picture meeting up with the contour picture, the bar code position corresponding to the standard contour picture may be queried.

After the contour querying module 606 queries the position of the bar code, the producing module 607 of the computing device 60 produces a movement instruction according to the queried bar code position. Specifically, the producing module 607 of the computing device 60 converts the queried bar code position into a position corresponding to the acquisition image by using an image conversion matrix which applies a rotation conversion and a shift conversion, to produce a movement instruction. Further, the transmitting module 608 of the computing device 60 transmits the movement instruction produced by the producing module 607 of the computing device 60 to the bar code reading device 50.

After the bar code reading device 50 acquires the movement instruction obtained from the computing device 60, the bar code reading device 50 may be moved along X-axis, Y-axis and Z-axis to the position corresponding to the bar code on the detection PCB 10, to read the product serial number of the bar code. The bar code reading device 50 reads the production serial number of the bar code by a single dimensional bar code decoding or a two dimensional decoding manner. It is to be noted that the bar code reading device 50 is disposed vertically above the conveying belt 20, and may move along X-axis, Y-axis, and Z-axis, and may be schematically known from FIG. 1B.

The computing device 60 is connected to the bar code reading device 50 by a cable transmission or a wireless transmission fashion, and receives the production serial number from the bar code reading device 50 at its receiving module 603.

In the computing device 60, a detection drafting library 602 is pre-established, in which a production serial number and detection drafting are stored correspondingly. When the receiving module 603 of the computing device 60 receives the production serial number, the querying module 609 of the computing device 60 may find the detection drafting corresponding to the production serial number from the detection drafting library 602.

After the querying module 609 of the computing device 60 finds the detection drafting, the detection module 610 of the computing device 60 optically detects the PCB 10 according to the detection drafting through the image acquiring device 50, whereby conveniently and rapidly detecting the PCB 10 as a purpose and effect.

Figure 2A:
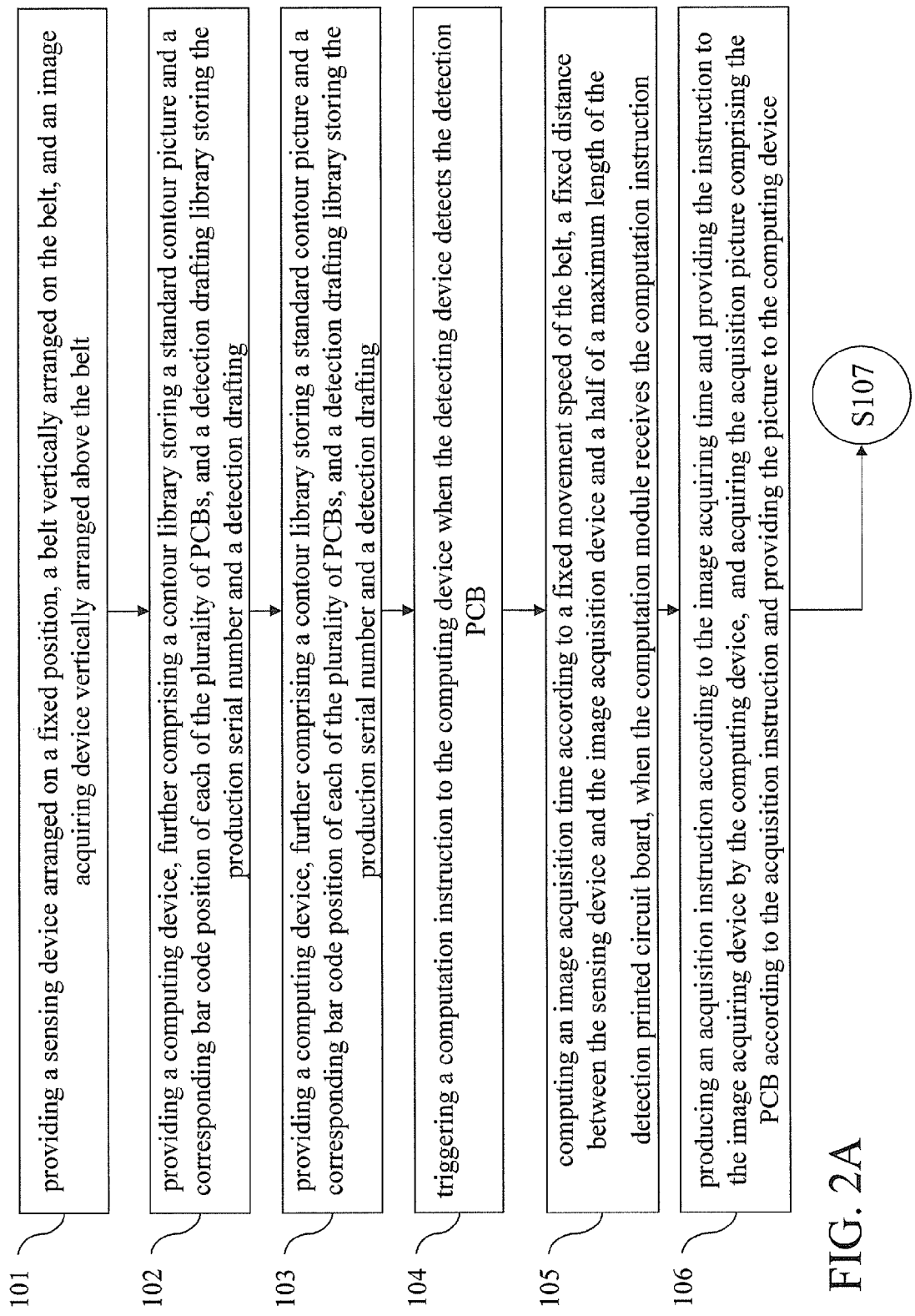

Next, an embodiment is set forth to explain how the present invention is operated in terms of its process flow. The following description regarding this embodiment will be given with reference concurrently to FIG. 1A to FIG. 1C, FIG. 2A and FIG. 2B, in which FIG. 2A and FIG. 2B are jointly a flowchart of the detecting method suitably used on a production line according to the present invention.

The plurality of PCBs 10 are disposed on the conveying belt 20, and moved by being driven by the conveying belt 20. On each of the detection PCB 10, a bar code is provided (S101), which includes a single dimensional bar code and a two dimensional bar code, each containing a production serial number. Further, the detection PCBs may be the same detection PCBs 10 or different detection PCBs 10. Namely, the detection PCBs 10 on the conveying belt 20 may totally the same kind, or totally different kinds. Alternatively, on the conveying belt 20 may be some identical and the other different detection PCBs 10. The above is merely examples, without limiting the present invention.

The sensing device 30 is disposed on a fixed position on the conveying belt 20 (S102) and may detect the detection PCB 10 on the conveying belt 20 by means of infrared (merely an example, without limiting the present invention), and may trigger a calculating instruction and provide the calculating instruction to the computing device 60 when detecting the detection PCB 10 (S104).

The computing device 60 may be a desktop computer and a notebook computer, etc, which are merely examples, without limiting the present invention. The computing device 60 may connect to the sensing device 30 through a cable connection or a wireless transmission manner, and receives from the sensing device 30 by the receiving module 603 thereof.

When the receiving module 603 of the computing device 60 receives the calculating instruction, the computation module 604 of the computing device 60 may calculate an image acquiring time according to a fixed moving speed of the conveying belt 10 and a fixed distance between the sensing device 30 and the image acquiring device 40 (S105). In the embodiment, assume the conveying belt 10 has a fixed speed of "5 cm/s", a fixed distance between the sensing device 30 and the image acquiring device 40 is "50 cm", and the detection PCB 10 has a half of its maximum length of "50 cm". The sum of the fixed distance between the sensing device 30 and the image acquiring device 40 and the half length of the detection PCB 10 is obtained and the sum is divided by the fixed movement speed of the conveying belt 10 as "5 cm/s". And the calculated image acquiring time is "20 s".

After the computation module 604 of the computing device 60 calculates the image acquiring time as "20 s", the producing module 607 of the computing device 60 produces an acquiring instruction according to the image acquiring time "20 s", and the transmitting module 608 of the computing device 60 transmits the produced acquiring instruction by the producing module 60 of the computing device 60 to the image acquiring device 40 (S106), which is vertically disposed above conveying belt 10 (S102).

Figure 3A:
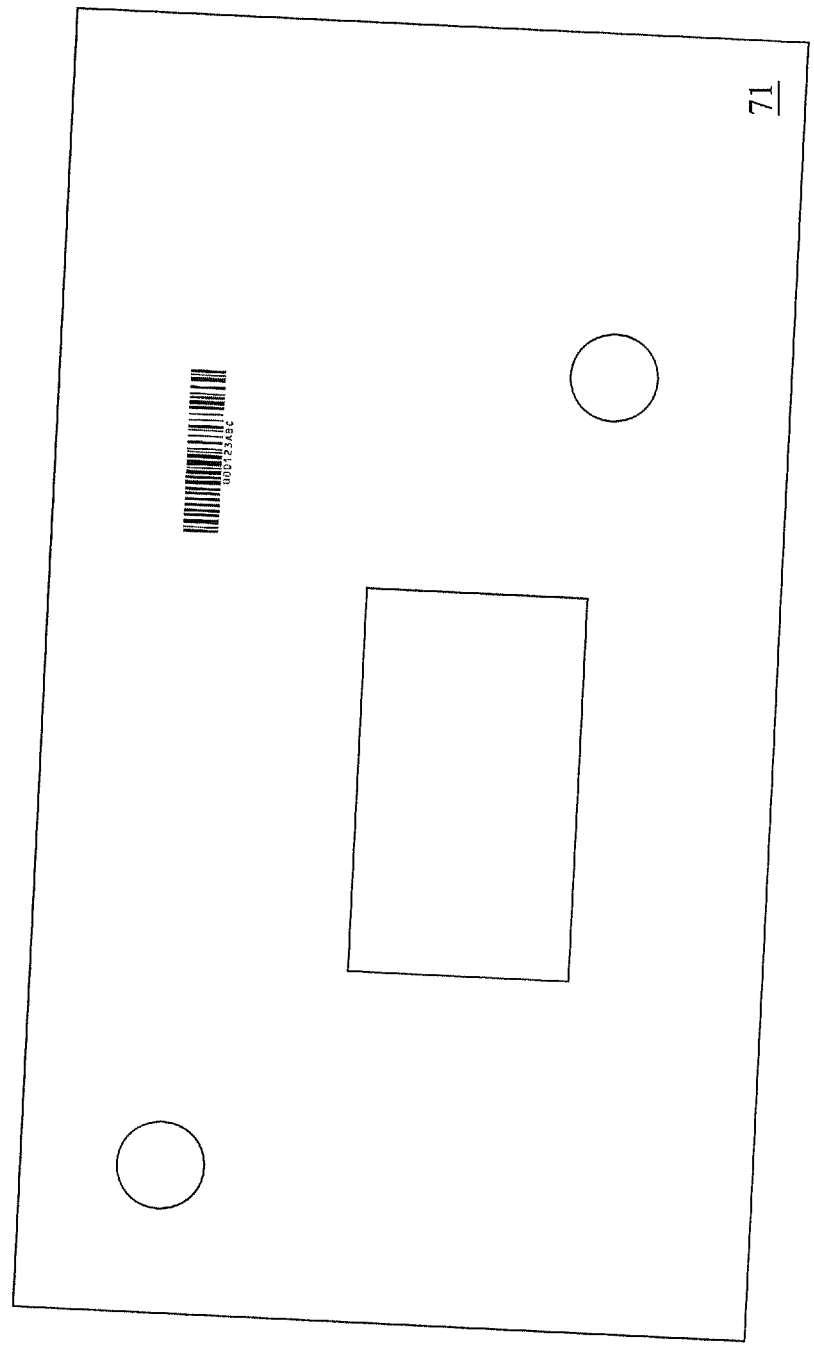
FIG. 3A is a schematic diagram of a detected acquired picture according to the present invention.
Figure 3B:
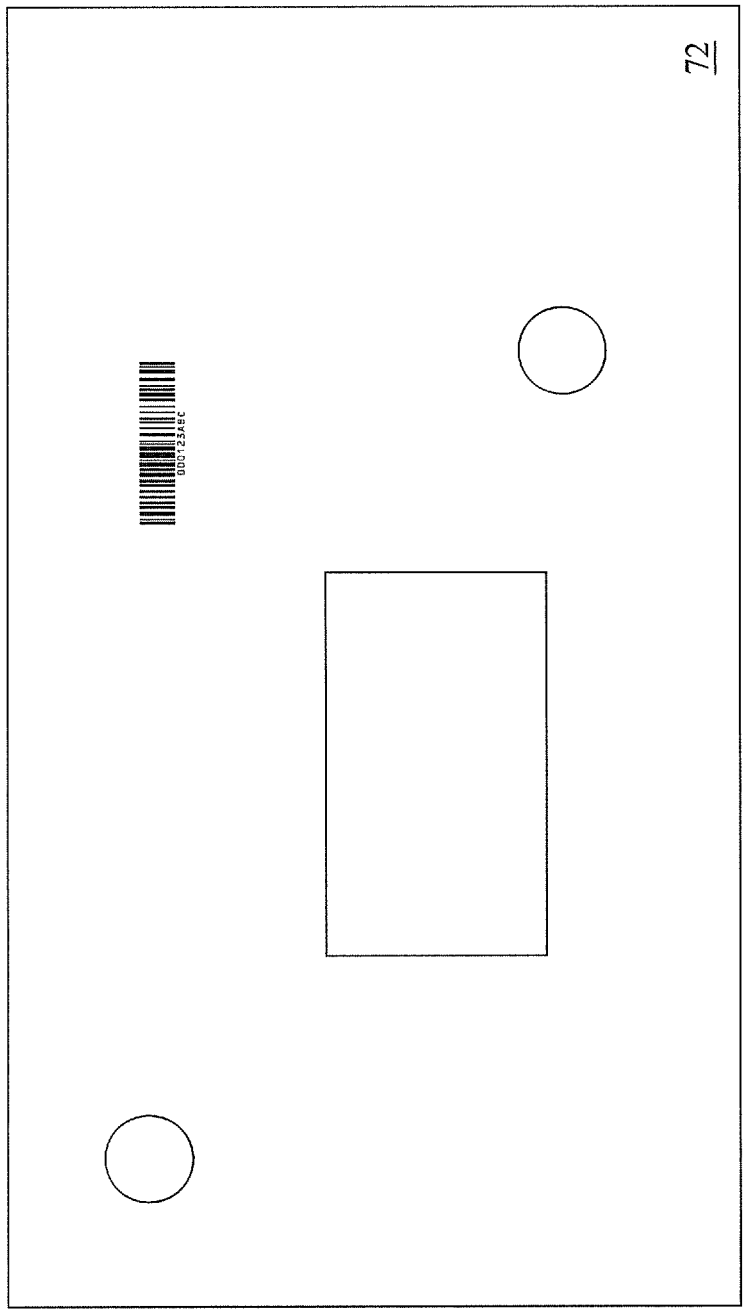
FIG. 3B is a schematic diagram of a detected contour picture according to the present invention.

Referring now to FIG. 3A and FIG. 3B, in which FIG. 3A is a schematic diagram of a detected acquired picture according to the present invention, and FIG. 3B is a schematic diagram of a detected contour picture according to the present invention.

After the image acquiring device 40 obtains the acquiring instruction from the computing device 60, it may acquire the acquisition picture 71 comprising the detection PCB and provide the acquisition picture 71 to the computing device 60 (S106). Namely, the image acquiring device 40 provides the acquisition image after the image acquiring device 40 computes the image acquiring time to the computing device 60. It is to be noted that the image acquiring device 40 is vertically disposed above the conveying belt 20 and may be referred in FIG. 1B for its arrangement.

The computing device 60 may connect to the image acquiring device 40 through a cable transmission or a wireless transmission, and receive the acquisition picture 71 from the image acquiring device 40 at its receiving module 603.

When the receiving module 603 of the computing device 60 receives the acquisition picture, the image processing module 605 of the computing device 60 converting the acquisition picture into a contour picture by using a two-value process and an image restoring process (S107). The image processing module 605 of the computing device 60 acquires a contour of the detection PCB 10 in the acquisition picture by using the two-value process. Then, the image restoring process is further used to convert the contour of the detection PCB after subjecting to the two-value process into a contour picture by using an image conversion matrix which applies a rotation conversion and a shift conversion. For the mentioned two-value process and the image restoring process, refer to their current technology directly, and omitted herein for clarity.

In the computing device 60, a contour library 601 is pre-established, in which a standard contour picture and a bar code position of each of the detection PCBs 10 is stored (S103). After the image processing module 605 of the computing device 60 converts the acquisition image into the contour picture, the contour querying module 606 of the computing device 60 compares the contour picture with each of the detection PCB 10 in the contour library 601. When the contour querying module 606 of the computing device 60 finds a standard contour picture meeting up with the contour picture, the bar code position corresponding to the standard contour picture may be queried (S108). In this embodiment, assume the contour querying module 606 of the computing device 60 find the bar code having its position of (200, 50).

After the contour querying module 606 queries the position of the bar code as (200, 50), the producing module 607 of the computing device 60 produces a movement instruction according to the queried bar code position (200, 50). Specifically, the producing module 607 of the computing device 60 converts the queried bar code position (200, 50) into a position (150, 100) corresponding to the acquisition image 71 by using an image conversion matrix which applies a rotation conversion and a shift conversion, to produce a movement instruction. Further, the transmitting module 608 of the computing device 60 transmits the movement instruction produced by the producing module 607 of the computing device 60 to the bar code reading device 50 (S109), the bar code reading device 50 being disposed above the conveying belt 50 (S102).

After the bar code reading device 50 acquires the movement instruction obtained from the computing device 60, the bar code reading device 50 may be moved along X-axis, Y-axis and Z-axis to the position (150, 100) corresponding to the bar code on the detection PCB 10, to read the product serial number "000123ABC" of the bar code (S110). The bar code reading device 50 reads the production serial number "000123ABC" of the bar code by a single dimensional bar code decoding or a two dimensional decoding manner. It is to be noted that the bar code reading device 50 is disposed vertically above the conveying belt 20, and may move along X-axis, Y-axis, and Z-axis, and may be schematically known from FIG. 1B.

The computing device 60 is connected to the bar code reading device 50 by a cable transmission or a wireless transmission fashion, and receives the production serial number "000123ABC" from the bar code reading device 50 at its receiving module 603 (S110).

In the computing device 60, a detection drafting library 602 is pre-established, in which a production serial number and detection drafting are stored correspondingly. When the receiving module 603 of the computing device 60 receives the production serial number, the querying module 609 of the computing device 60 may find the detection drafting "drafting A" corresponding to the production serial number 000123ABC" from the detection drafting library 602 (S111).

After the querying module 609 of the computing device 60 finds the detection drafting "drafting A", the detection module 610 of the computing device 60 optically detects the PCB 10 according to the detection drafting "drafting A" through the image acquiring device 50 (S112), whereby conveniently and rapidly detecting the PCB 10 as a purpose and effect.

As compared to the prior art, the system and method of the present invention has the difference that the sensing device is arranged on a fixed position of the conveying belt, the image acquiring device and the bar code reading device are vertically arranged above the conveying belt, respectively, the computing device calculates the picture acquiring time of the acquired picture comprising the detection PCB acquired by the image acquiring device, and the computing device calculates the position to be moved by the bar code reading device to control the bar code reading device to move and read the production serial number of the detection PCB, whereby the corresponding detection drafting is queried according to the production serial number and optically detecting the detection PCB according to the detection drafting.

By means of the above technical means, the detection PCB may be detected on the production line, and thus promoting the production efficiency and detection efficiency of the detection PCB, whereby overcoming the associated issue long encountered in the prior art.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A detecting system used on a production line, comprising:
 a plurality of detection printed circuit boards, each having a bar code;
 a conveying belt, conveying each of a plurality of detection boards laying on the belt;
 a sensing device, arranged on a fixed position, and triggering a computation instruction when sensing the detection printed circuit board;
 an image acquiring device, vertically arranged on the belt, and acquiring an acquisition picture comprising the detection printed circuit board according to an acquisition instruction;

a bar code reading device, vertically arranged on the belt, and reading a production serial number corresponding to the bar code; and a computing device, further comprising:
- a contour library, storing a standard contour picture and a corresponding bar code position of each of the plurality of printed circuit boards;
- a detection drafting library, storing the production serial number and a detection drafting;
- a receiving module, receiving the computation instruction from the sensing device, and acquiring the acquisition picture and receiving the production serial number from the bar code;
- a computation module, computing an image acquisition time according to a fixed movement speed of the belt, a fixed distance between the sensing device and the image acquisition device and the a half of a maximum length of each of the detection printed circuit boards;
- an image processing module, conversing the acquisition picture into a contour picture through a two-value process and an image restoration process to converse the acquisition picture into a contour picture;
- a contour querying module, comparing the contour picture with each of the standard contour picture of each of the plurality of detection print circuit boards, to query the corresponding bar code position;
- a producing module, producing the acquisition instruction according to the image acquisition time, and producing the movement instruction according to the queried bar code;
- a transmission module, transmitting the acquisition instruction to the image acquisition device, and transmitting the movement instruction to the bar code;
- a query module, optically detecting the detection printed circuit board through the detection drafting according to the detection drafting through the image acquisition device; and
- a detection module, optically detecting the detection printed circuit board through the image acquisition device according to the detection drafting.

2. The detection system as claimed in claim 1, wherein the bar code comprises a one dimension bar code and a two dimension bar code.

3. The detection system as claimed in claim 1, wherein the bar ode reading device reads the production serial number of the bar code.

4. The detection system as claimed in claim 1, wherein the image restoration process converses the acquisition picture into the contour picture through a rotation and shift process into the contour picture.

5. The detection system as claimed in claim 1, wherein the producing module conversing the bar code position into the corresponding position of the acquisition picture through an image conversion matrix to produce the movement instruction.

6. A detecting method used on a production line, comprising:
- providing a plurality of detection printed circuit boards each having a bar code, and being moved by a conveying belt;
- providing a sensing device arranged on a fixed position, a belt vertically arranged on the belt, and an image acquiring device vertically arranged above the belt;
- providing a computing device, further comprising a contour library storing a standard contour picture and a corresponding bar code position of each of the plurality of printed circuit boards, and a detection drafting library storing the production serial number and a detection drafting;
- triggering a computation instruction to the computing device when the detecting device detects the detection print circuit board;
- computing an image acquisition time according to a fixed movement speed of the belt, a fixed distance between the sensing device and the image acquisition device and a half of a maximum length of the detection printed circuit board, when the computation receives the computation instruction;
- conversing the acquisition picture into a contour picture through a two-value process and an image restoration process to converse the acquisition picture into a contour picture;
- comparing the contour picture with each of the standard contour picture of each of the plurality of detection print circuit boards, to query the corresponding bar code position;
- producing an acquisition instruction according to the image acquisition time and providing the image acquisition time to the image acquisition device by the computing device, acquiring an acquisition picture comprising the detection printed circuit according to the acquisition instruction and providing the acquisition picture to the computing device;
- conversing the acquisition picture into a contour picture through a two-value process and an image restoration process by the computing device;
- comparing the contour picture with a standard contour picture of each of the detection printed circuit boards to query the corresponding bar code position by the computing device;
- moving to the corresponding barcode position on each of the plurality of detection printed circuit boards by the bar code reading device to read a product serial number of the bar code and providing the product serial number to the computing device;
- querying the detection drafting corresponding to the product serial number from the detection drafting library by the computing device; and
- optically detecting the detection printed circuit board through the image acquisition device by the computing device according to the detection drafting.

7. The detection system as claimed in claim 6, wherein the bar code comprises a one dimension bar code and a two dimension bar code.

8. The detection method as claimed in claim 6, wherein the bar ode reading device reads the production serial number of the bar code.

9. The detection method as claimed in claim 6, wherein the image restoration process converses the acquisition picture into the contour picture through a rotation and shift process into the contour picture.

10. The detection method as claimed in claim 6, wherein the producing module conversing the bar code position into the corresponding position of the acquisition picture through an image conversion matrix to produce the movement instruction.

\* \* \* \* \*